United States Patent
Tsou et al.

(10) Patent No.: US 10,280,270 B2
(45) Date of Patent: May 7, 2019

(54) SILANE FUNCTIONALIZED POLYOLEFINS FOR POLYOLEFIN NANOCOMPOSITES

(71) Applicant: ExxonMobil Chemical Patents Inc., Baytown, TX (US)

(72) Inventors: Andy H. Tsou, Houston, TX (US); Yong Yang, Kingwood, TX (US); Hillary L. Bradshaw, Houston, TX (US); George Rodriguez, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 737 days.

(21) Appl. No.: 14/877,226

(22) Filed: Oct. 7, 2015

(65) Prior Publication Data

US 2016/0145361 A1     May 26, 2016

Related U.S. Application Data

(60) Provisional application No. 62/083,347, filed on Nov. 24, 2014.

(51) Int. Cl.

| | | |
|---|---|---|
| *C08F 110/06* | (2006.01) | |
| *C08J 3/24* | (2006.01) | |
| *C08J 5/18* | (2006.01) | |
| *D01F 6/06* | (2006.01) | |
| *C08F 8/42* | (2006.01) | |
| *D01F 1/10* | (2006.01) | |

(52) U.S. Cl.
CPC ............... *C08J 3/245* (2013.01); *C08F 8/42* (2013.01); *C08J 5/18* (2013.01); *D01F 1/10* (2013.01); *D01F 6/06* (2013.01); *C08J 2323/12* (2013.01)

(58) Field of Classification Search
CPC .................................................. C08F 110/06
See application file for complete search history.

(56) References Cited

U.S. PATENT DOCUMENTS

| | | | |
|---|---|---|---|
| 3,505,279 A * | 4/1970 | Davis, Sr. ............... | C03C 25/30 523/203 |
| 5,229,022 A | 6/1993 | Song et al. | |
| 6,916,536 B1 | 7/2005 | Hammen et al. | |
| 8,426,659 B2 | 4/2013 | Holtcamp et al. | |
| 8,501,894 B2 | 8/2013 | Crowther et al. | |
| 8,623,974 B2 | 1/2014 | Jiang et al. | |
| 8,669,326 B2 | 3/2014 | Hagadorn et al. | |
| 8,669,330 B2 | 3/2014 | Stewart | |
| 8,754,170 B2 | 6/2014 | Hagadorn et al. | |
| 8,816,027 B2 | 8/2014 | Crowther et al. | |
| 8,840,996 B2 | 9/2014 | Tsou et al. | |
| 8,841,394 B2 | 9/2014 | Crowther et al. | |
| 8,940,839 B2 | 1/2015 | Hagadorn et al. | |
| 8,993,702 B2 | 3/2015 | Crowther et al. | |
| 10,023,719 B2 | 7/2018 | Luo et al. | |
| 2009/0018290 A1 | 1/2009 | Casty et al. | |
| 2009/0318644 A1 | 12/2009 | Brant et al. | |
| 2010/0227162 A1 | 9/2010 | Patil et al. | |
| 2012/0171140 A1 | 7/2012 | Bui et al. | |
| 2012/0245293 A1 | 9/2012 | Crowther et al. | |
| 2012/0245300 A1 | 9/2012 | Crowther et al. | |
| 2013/0158180 A1 | 6/2013 | Tsou et al. | |
| 2014/0088217 A1 | 3/2014 | Ng et al. | |
| 2014/0088264 A1 | 3/2014 | Crowther et al. | |
| 2014/0121316 A1 | 5/2014 | Monsallier et al. | |
| 2014/0275433 A1 | 9/2014 | Ng et al. | |
| 2014/0336324 A1 | 11/2014 | Tsou et al. | |

FOREIGN PATENT DOCUMENTS

| | | |
|---|---|---|
| EP | 1 493 765 | 1/2005 |
| WO | 2004/024800 | 3/2004 |
| WO | 2009/155471 | 12/2009 |

(Continued)

OTHER PUBLICATIONS

U.S. Appl. No. 61/704,611, filed Sep. 24, 2012, Kulkarni et al.
U.S. Appl. No. 61/704,725, filed Sep. 24, 2012, Crowther et al.
U.S. Appl. No. 61/860,407, filed Jul. 31, 2013, Tsou et al.
U.S. Appl. No. 61/866,702, filed Aug. 16, 2013, Blok et al.
Bracho et al., "Functionalization of Silica Nanoparticles for Polypropylene Nanocomposite Applications," Journal of Nanomaterials, vol. 2012 (2012) pp. 1-8.

(Continued)

*Primary Examiner* — Kuo Liang Peng

(74) *Attorney, Agent, or Firm* — Kevin M. Faulkner

(57) ABSTRACT

Described is a silane functionalized polyolefin and a method of forming the composition, the composition comprising compounds having the following structure:

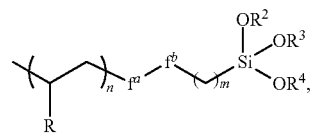

wherein $R^2$, $R^3$, and $R^4$ are independently selected from hydrogen, C1 to C10 linear alkyls, C6 to C14 aryls, C7 to C20 alkylaryls, and substituted versions thereof; n has a value within the range from 20 to 2000; m has a value within the range from 1 to 10 or 20; R is selected from hydrogen or C1 to C10 alkyls; and $f^a$ and $f^b$ are residual functional moieties selected from carbon, oxygen, nitrogen, sulfur, phosphorous, silicon, and boron, where any remaining valences are bound to a group selected from hydrogen, C1 to C10 linear alkyls, C6 to C14 aryls, C7 to C20 alkylaryls, and substituted versions thereof.

12 Claims, 3 Drawing Sheets

(56) References Cited

FOREIGN PATENT DOCUMENTS

| WO | 2009/155472 | 12/2009 |
|----|-------------|---------|
| WO | 2009/155510 | 12/2009 |
| WO | 2009/155517 | 12/2009 |
| WO | 2012/134716 | 10/2012 |
| WO | 2013/041151 | 3/2013 |
| WO | 2013/116196 | 8/2013 |
| WO | 2016/093934 | 6/2016 |

OTHER PUBLICATIONS

Gelest, Inc. "*Silane Coupling Agents: Connecting Across Boundaries,*" (2006) pp. 1-60.
Mulhaupt et al., "*Functional Polypropylene Blend Compatibilizers,*" Makromoledulare Chemie, Macromolecular Symposia, vol. 48/49 (1991) pp. 317-332.
Pelto et al., "*Surface Modification of Nanosilica for PP Composites,*" Materials Science Forum, vol. 714, (2012) pp. 91-98.

* cited by examiner

_US 10,280,270 B2_

SILANE FUNCTIONALIZED POLYOLEFINS FOR POLYOLEFIN NANOCOMPOSITES

CROSS-REFERENCE TO RELATED APPLICATION

This invention claims priority to and the benefit of U.S. Ser. No. 62/083,347. filed Nov. 24, 2014 and is related to U.S. Ser. No. 62/068,043 filed Oct. 24, 2014 and U.S. Ser. No. 62/110,755 filed Oct. 24, 2014, fully incorporated herein by reference.

FIELD OF THE INVENTION

The present invention relates to functionalized polyolefins useful for forming compositions containing surface hydroxyl-containing fillers and polyolefins.

BACKGROUND OF THE INVENTION

It is desirable to add fillers to polymer compositions to improve properties such as heat distortion temperatures, dimensional stability, and stiffness. However, this presents some problems. First, many fillers are not compatible with polymers, especially polyolefin polymers which tend to be highly non-polar. A further problem is that there is an increasing desire to use nanoparticles (less than 0.1 μm in one dimension) to improve the performance of thin films and micro and nano-fibers made from polyolefins. Such nanoparticles have very high surface areas so they disperse even more poorly than larger particles.

Dispersing polar nanofillers in nonpolar polyolefins has always been challenging. Despite the theoretical promises of having a polyolefin nanocomposite with nano-dispersed silica clusters for enhancements in mechanical stiffness, strength, rheological melt strength, shear thinning, and in thermal heat distortion resistance, there are currently no polyolefin-silica nanocomposites commercially available. What is needed is a way to thoroughly disperse polar nanoparticles such as silica into a polyolefin (e.g., polyethylene and/or polypropylene) matrix. The present invention(s) is directed to such an end.

Related disclosures include U.S. Pat. No. 8,840,996; WO 2004/024800; WO 2013/041151; US 2014/088264; US 2014/275433; Gelest Inc., "Silane Coupling Agents: Connecting Across Boundaries" (2006); and U.S. Ser. No. 61/866,702, filed Aug. 16, 2013.

SUMMARY OF THE INVENTION

Described herein is a silane functionalized polyolefin comprising compounds having the following structure:

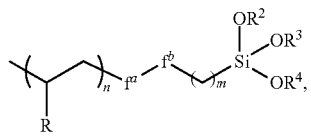

wherein $R^2$, $R^3$, and $R^4$ are independently selected from hydrogen, C1 to C10 linear alkyls, C6 to C14 aryls, C7 to C20 alkylaryls, and substituted versions thereof;
R is hydrogen, a C1 to C10 alkyl, or a mixture thereof;
n has a value within the range from 20 to 2000;
m has a value within the range from 1 to 10 or 20; and $f^a$ and $f^b$ are residual functional moieties selected from carbon, oxygen, nitrogen, sulfur, phosphorous, silicon, and boron, where any remaining valences are bound to a group selected from hydrogen, C1 to C10 linear alkyls, C6 to C14 aryls, C7 to C20 alkylaryls and arylalkyls, and substituted versions thereof.

Also described herein is a method of forming a silane functionalized polyolefin comprising combining the following components:

a) a functionalized polyolefin having the following structure:

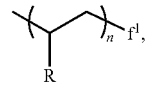

wherein n has a value within the range from 20 to 2000;
R is hydrogen, a C1 to C10 alkyl, or a mixture thereof; and
$f^1$ is functional moiety capable of forming a covalent bond through a chemical reaction with a complementary functional moiety, $f^2$; and b) a functionalized silane having the following structure:

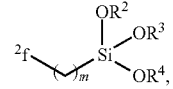

wherein m has a value within the range from 1 to 10 or 20;
$R^2$, $R^3$, and $R^4$ are independently selected from hydrogen, C1 to C10 linear alkyls, C6 to C14 aryls, C7 to C20 alkylaryls and arylalkyls, and substituted versions thereof; and
$f^2$ is a functional moiety capable of forming a covalent bond through a chemical reaction with a complementary functional moiety, $f^1$.

DETAILED DESCRIPTION OF THE INVENTION

Figure 1:
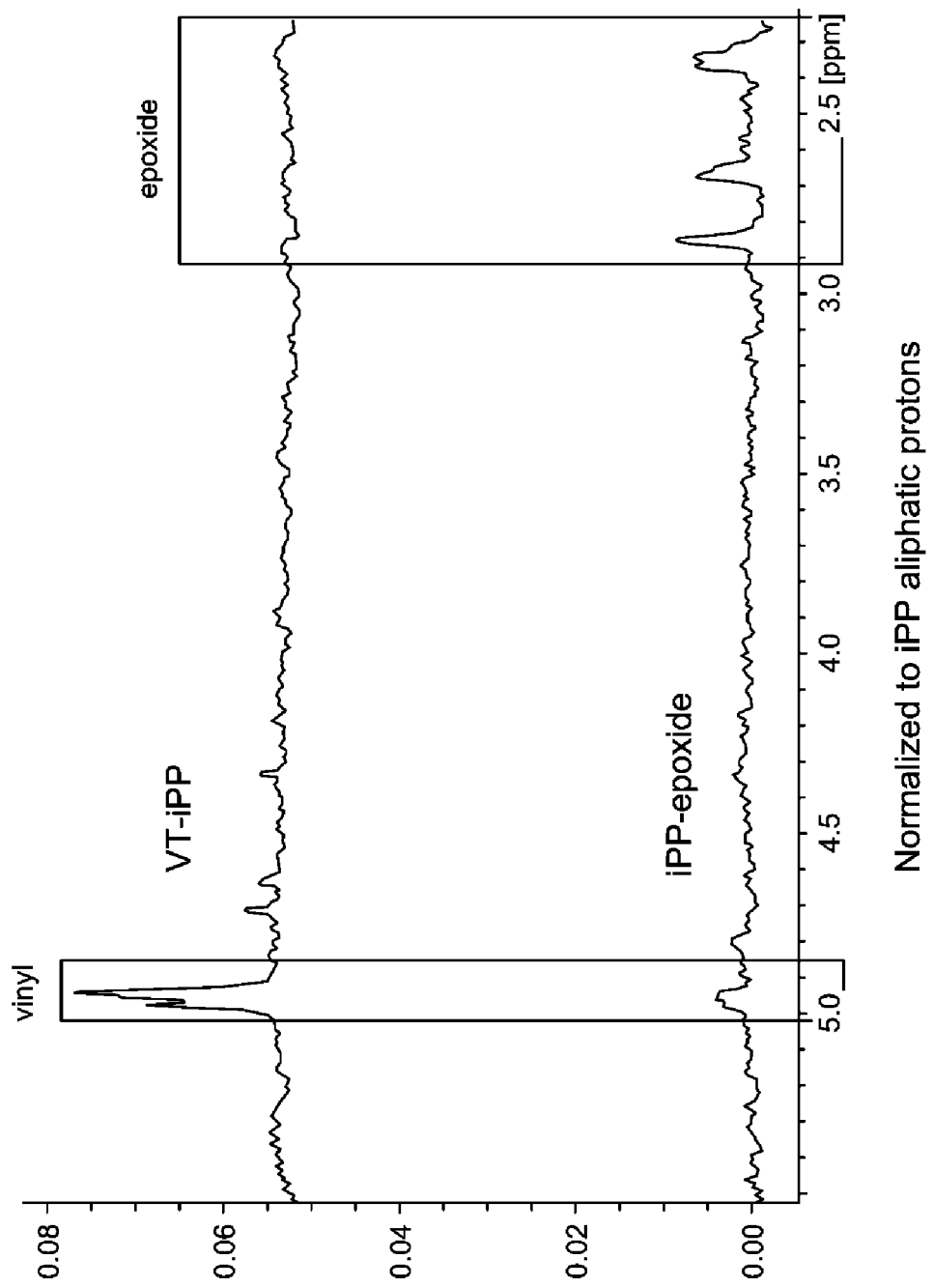
FIG. 1 is an offset overlay of $^1$H NMR (500 MHz) (same x-axis) spectra of vinyl terminated isotactic polypropylene (VT-iPP) and the functionalized iPP.

The present invention is directed to functionalized polyolefins that allow grafting to surface hydroxyl-containing inorganic fillers such as silica, as well as hydroxyl-containing carbon based fillers. Functionalization of polyolefins with alkoxysilanes allows the grafting of the functionalized polyolefins onto silica surfaces to create polyolefin-grafted-silica particles, or so-called "hairy" particles. These polyolefin-grafted-silica particles can be readily dispersed in polyolefins, leading to significant enhancements in mechanical strength, rheological and thermal properties without compromising the toughness of the polyolefins. Functionalization of vinyl-terminated polyethylene and vinyl-terminated polypropylene with alkoxysilanes allows the grafting of the silane-functionalized polyethylene (PE) and silane-functionalized polypropylene (PP) onto silica nanoparticles. The resultant PE-g-silica, PP-g-silica, or PE-g-silica-g-PP ("graft" compositions) can then be dispersed in PE, PP, or PE/PP compositions for the preparation of polyolefin nanocomposites.

Thus, the invention can be described in any embodiment as silane functionalized polyolefins comprising compounds having the following structures (1):

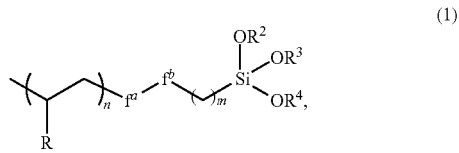

(1)

wherein the structure includes a polyolefin portion, left of and including "r", and the silane functional portion, to the right of and including "f$^b$";

R is hydrogen, a C1 to C10 alkyl, or a mixture thereof, most preferably a hydrogen (when the polyolefin is polyethylene) or methyl (when the polyolefin is polypropylene), or mixture thereof (when the polyolefin is an ethylene-propylene copolymer);

$R^2$, $R^3$, and $R^4$ are independently selected from hydrogen, C1 to C10 linear alkyls, C6 to C14 aryls, C7 to C20 alkylaryls and arylalkyls, and substituted versions thereof; and, more preferably, wherein $R^2$, $R^3$, and $R^4$ are independently selected from hydrogen, and C1 to C10 linear alkyls; and most preferably, each of $R^2$, $R^3$, and $R^4$ are independently selected from hydrogen, methyl and ethyl;

n has a value within the range from 20 to 2000, most preferably within the range from 100 to 2000;

m has a value within the range from 1 to 10, or 20, and is most preferably a propylene or butylene group, or "linker" group (m is 3 or 4); and $f_n$ and $f^b$ are "residual" functional moieties selected from carbon, oxygen, nitrogen, sulfur, phosphorous, silicon, and boron, where any remaining valences are bound to a group selected from hydrogen, hydroxyl, halogen, carboxyl, C1 to C10 linear alkyls, C6 to C14 aryls, C7 to C20 alkylaryls, and substituted versions thereof. By "residual," what is meant here is that the "f" moieties in structure (1) were created, or left over as the result of chemical reactions used in the synthesis of the silane functionalized polyolefin whereby two functionalized precursors are combined to form a covalent bond and thus the entire silane functionalized polyolefin. This will become more apparent in the description below.

The method of producing the silane functionalized polyolefin is also part of the invention, and is described in more detail below. But here it will be stated for understanding that structure (1) is preferably formed by the reaction of two functional moieties, one bound to a polyolefin and another bound to the silane compound, such that f$^1$ reacts with f$^2$ to form a covalent bond, as by, for example, the following reactions: substitution, condensation, metathesis, rearrangement, Alder-ene, Friedel-Crafts, Grignard, treatment with a strong reducing agent (e.g., NaBH$_4$ in methanol), etc. What is left from the reaction are the residual functional moieties f$^a$ and f$^b$.

By "substituted versions thereof," what is meant is that the alkyl or aryl or alkylaryl groups referred to may be further substituted by groups such as halogens, hydroxyl, carboxylates, thiols, other silanes, borates, silicates, sulfates, and nitrates, in any one or more positions of the group referred to.

In any case, the silane functionalized polyolefins more preferably have the following structure (2):

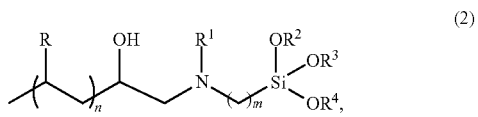

(2)

wherein R, $R^2$, $R^3$, and $R^4$, m, and n have the meanings here as they do for structure (1), and $R^1$ is selected from hydrogen, C1 to C10 linear alkyls, C6 to C14 aryls, C7 to C20 alkylaryls and arylalkyls, and substituted versions thereof. More preferably, $R^1$ is aryl, alkylaryl, arylalkyl, or substituted versions thereof, and most preferably, a C1 to C5 alkyl or phenyl group. This structure (2) more closely represents the reaction product of a preferred coupling reaction pathway to couple the polyolefin and silane portions of the inventive silane functionalized polyolefin. In structure (2), the "residual" moieties are a —CH(OH)CH$_2$— group, corresponding to "ft", and the —NH-group, corresponding to "f$^b$".

In any embodiment, the silane functionalized polyolefin comprises the polyolefin portion and the silane functional portion, wherein the polyolefin portion is a polypropylene, polyethylene, or ethylene-propylene copolymer. As used herein, "polypropylene" refers to homopolymers of propylene-derived units, or copolymers of propylene with ethylene or a C4 to C10 α-olefin comonomers, wherein the comonomer is present in the copolymer within the range from 0.1, or 0.2 wt % to 1, or 2, or 4, or 5 wt %, by weight of the polypropylene. As used herein, "polyethylene" refers to homopolymers of ethylene-derived units, or copolymers of ethylene with, within the range from 0.1, or 0.2 wt % to 1, or 2, or 4, or 5, or 10, or 20 wt %, by weight of the polyethylene, a C3 to C10 α-olefin. An "ethylene-propylene" copolymer is a specific copolymer wherein the amount of ethylene-derived units can be within the range from 10, or 30, or 40 wt % to 60, or 70, or 80, or 90 wt %, by weight of the ethylene-propylene copolymer. Common ethylene-propylene copolymers include ethylene-propylene rubbers, plastomers, or propylene-based elastomers. As it relates to the polyolefin portion of the inventive silane functionalized polyolefins, it is understood that the term, for example, "polypropylene" refers to the polymeric portion of the compound.

The invention also includes a graft polyolefin ("g-PO") useful as an additive to polyolefins (e.g., polyethylenes or polypropylenes) and polyolefin compositions (e.g., an impact copolymer, thermoplastic polyolefin, etc.) comprising the silane functionalized polyolefin described herein and at least one surface hydroxyl-containing inorganic or carbon nanofiller, or as used herein, simply "filler." In any embodiment, the level of the graft polyolefin used as an additive can be within a range from 1, or 2, or 5 wt % to 10, or 20, or 30 wt %, by weight of the graft polyolefin and polyolefin or polyolefin composition to which it is added. The combination of at least one polyolefin selected from polypropylene, polyethylene, and ethylene-propylene copolymers, so-called plastomers, and propylene-based elastomers and the graft polyolefin is the "polyolefin nanocomposite."

In any embodiment, the fillers are selected from solid materials having surface hydroxyl and/or carboxy groups, and more preferably from solid materials having siliceous surface chemistry. In any embodiment, the filler has an average particle size of less than 0.1 μm in one dimension, meaning the shape can range between a sphere or ellipse to a strand or whisker. Most preferably, the dimension is within a range from 0.001, or 0.005, or 0.01 μm to 0.05, or 0.10 μm in the shortest direction. Preferably, the filler is selected from the group consisting of silicates, aluminates, borates, silica, quartz, glass, alumina, alumino-silicates, silicon, copper, copper oxide, tin, tin oxide, talc, iron oxide, chromium oxide, steel, iron, nickel, zinc, lead, and calcium carbonate, and mixtures thereof. Most preferably, the filler is spherical or slightly ellipsoidal, and is colloidal silica. Desirable fillers will also be slightly to strongly acidic on the surface.

A variety of additives may be incorporated into the polyolefin nanocomposites of this invention. Such additives include, for example, stabilizers, antioxidants, fillers, colorants, slip additives, etc. Primary and secondary antioxidants include, for example, hindered phenols, hindered amines, and phosphates. Other additives such as dispersing agents, for example, Acrowax™ C, can also be included. Slip agents include, for example, oleamide and erucamide. Catalyst deactivators are also commonly used, for example, calcium stearate, hydrotalcite, calcium oxide, acid neutralizers, and other chemicals known in the art. The present invention relates to significant enhancement of crystallization temperature without the addition of external nucleating agents (nucleators). External nucleating agents or nucleators include, for example, sodium benzoate, talc, and derivatives thereof. Also, other nucleating agents may be low weight average molecular weight (less than 30,000 g/mol) Ziegler-Natta olefin products or other highly crystalline polymer. Finally, some additional additives may include small amounts (e.g., 5 to 20 wt %) of ethylene-based plastomers, propylene based elastomers, and low density polyethylenes.

In any case, the polyolefin nanocomposites described herein can be formed into any type of useful articles that can be thermoformed, extruded, injection molded, or formed by any other known method of forming articles from polyolefins. In any preferred embodiment, the polyolefin nanocomposites can be formed into fabrics or films by techniques known in the art.

The invention also includes a method of forming the silane functionalized polyolefin comprising combining under suitable conditions to cause the functional groups to react to form at least one covalent bond, a functionalized polyolefin and a functionalized silane, the scheme including a coupling reaction of at least the components (3) and (4): a functionalized polyolefin having the following structure:

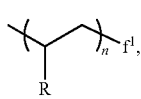

(3)

wherein R has the same meaning as in (1), and n has a value as described above with respect to structure (1); $f^1$ is a functional moiety capable of forming a covalent bond through a chemical reaction with a complementary functional moiety, $f^2$; and a functionalized silane having the following structure:

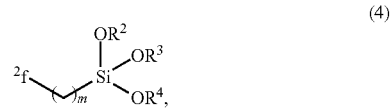

(4)

wherein m has a value as described above with respect to structure (1); $R^2$, $R^3$, and $R^4$ are also described as in structure (1); and $f^2$ is a functional moiety capable of forming a covalent bond through a chemical reaction with a complementary functional moiety, $f^1$. Any type of reaction that will result in the formation of at least one covalent bond between the residual $f^1$ and e moieties is acceptable, but preferably the at least one covalent bond is formed by the reaction of the two functional moieties, one bound to a polyolefin and another bound to the silane compound, as by, for example, the following reactions: substitution, condensation, metathesis, rearrangement, Alder-ene, Friedel-Crafts, Grignard, treatment with a strong reducing agent (e.g., $NaBH_4$ in methanol), etc.

Given the definitions above, the following scheme (A) is depicted summarizing the methods described herein:

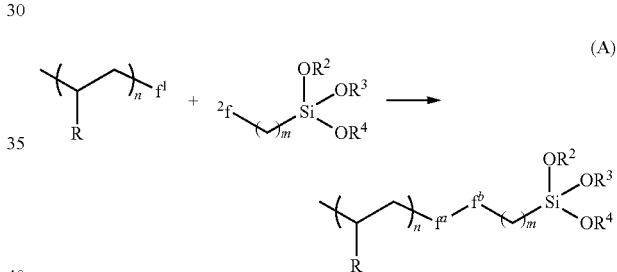

(A)

wherein $f^1$, $f^2$, $f^a$, $f^b$, and each "R" group are as described above; where, the reactive functional groups of the polyolefin portion and functionalized silane portion react to form at least one covalent bond, having residual functional groups left therein.

In any embodiment, the reaction scheme above is such that the functionalized silane has the following structure (5):

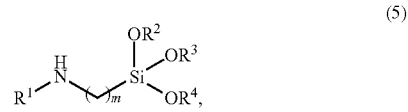

(5)

wherein m and each R group are as described above. More preferably, $R^1$ is aryl, alkylaryl, arylalkyl, or substituted versions thereof, and most preferably, a C1 to C5 alkyl or phenyl group.

In any embodiment, the reaction scheme above is such that the functionalized polyolefin has the following structure (6):

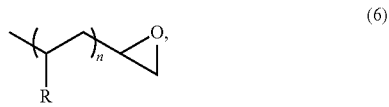

(6)

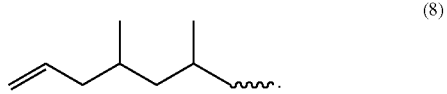

(8)

wherein n and R are as described above. Most preferably, the functionalized polyolefin is a functionalized polypropylene, polyethylene, or ethylene-propylene copolymer, wherein R is hydrogen, methyl, or a mixture thereof, respectively.

Given these more particular embodiments, the general reaction scheme can be depicted as in (B):

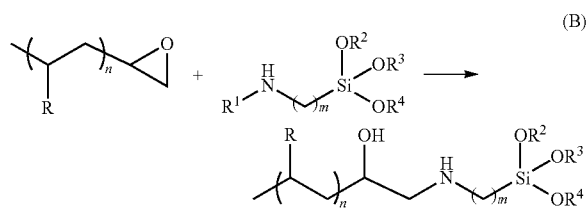

(B)

wherein each "R" group are as described above.

In any embodiment, the functionalized polyolefin is obtained by combining a vinyl/vinylidene-terminated polyolefin (VTP) with a functionalizing agent. The functionalizing agent can be any compound or formulation that, under suitable reaction conditions such as solvent and temperature will create a reactive functional group at the vinyl/vinylidene terminal end of the VTP that is complementary in the formation of a covalent bond with the functional group on the silane. Preferably, the functionalizing agent is selected from haloperoxybenzoic acids and haloperoxy C1 to C10 alkyl acids, maleic anhydrides, and benzyl halides. Examples include meta-chloroperoxybenzoic acid and meta-bromoperoxybenzoic acid. Most preferably, desirable reaction conditions to effect functionalization of the VTP include use of low dielectric solvent such as hexane, xylene or toluene, and elevated temperatures within the range from 50, or 60° C. to 100, or 120° C. Thus formed, the functionalized polyolefin, such as in structure (3) or (6), can be combined with the functionalized silane under similar conditions as described above, or other suitable conditions depending on the nature of the functional groups.

The vinyl/vinylidene-terminated polyolefins useful in the inventive functionalized polymers described herein can be made in any number of ways. By "vinyl/vinylidene", what is meant is that the polyolefin may be a mixture of both vinyl- and vinylidene-terminated polyolefins, or the polyolefin may be substantially all one form or the other. Preferably, the VTP's useful herein are polymers as first described in US 2009/0318644 having at least one terminus (CH$_2$CHCH$_2$-oligomer or polymer) represented by formula (7):

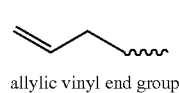

(7)

allylic vinyl end group where the " ~~~ " here represents the "PO" portion of the inventive functionalized polyolefins. In a preferred embodiment the allyl chain ends are represented by the formula (8):

The amount of allyl chain ends is determined using $^1$H NMR at 120° C. using deuterated tetrachloroethane as the solvent on a 500 MHz machine, and in selected cases confirmed by $^{13}$C NMR. These groups (7) and (8) will react to form a chemical bond with a metal as mentioned above to form the M-CH$_2$CH$_2$-polymer. In any case, Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl-terminated propylene polymers in Resconi et al, 114, J. AM. CHEM. SOC., 1025-1032 (1992) that are useful herein.

The vinyl/vinylidene-terminated propylene-based polymers may also contain an isobutyl chain end. "Isobutyl chain end" is defined to be an oligomer having at least one terminus represented by the formula (9):

(9)

In a preferred embodiment, the isobutyl chain end is represented by one of the following formulae (10):

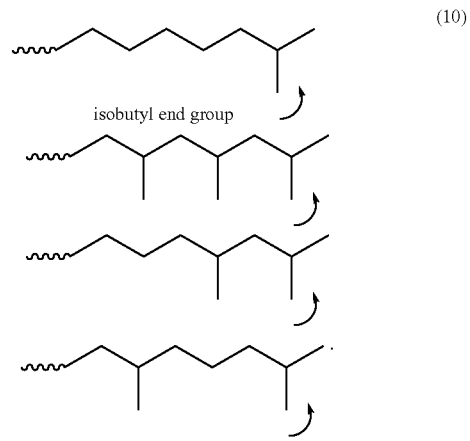

(10)

isobutyl end group

The percentage of isobutyl end groups is determined using $^{13}$C NMR (as described in the example section) and the chemical shift assignments in Resconi for 100% propylene oligomers. Preferably, the vinyl/vinylidene-terminated polymers described herein have an allylic terminus, and at the opposite end of the polymer an isobutyl terminus.

The VTPs can be made by any suitable means, but most preferably the VTPs are made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 1000 Å³) perfluorinated boron activator, for example, as described in US 2012/0245299.

The vinyl/vinylidene-terminated polyolefin can be any polyolefin having a vinyl/vinylidene-terminal group, and is preferably selected from the group consisting of vinyl/vinylidene-terminated isotactic polypropylenes, atactic polypropylenes, syndiotactic polypropylenes, propylene-butene copolymers, propylene-hexene copolymers, and propylene-ethylene copolymers (wherein the copolymers may be random, elastomeric, impact and/or block), and combinations thereof, each having a number-average molecular weight (Mn) of at least 300 g/mole. In any embodiments, the VTP may be a copolymer or terpolymer wherein the C2 content (ethylene derived units) of the vinyl/vinylidene-terminated polyolefin is from 3 to 50 wt %, the C3 content (propylene derived units) is from 50 to 97 wt %; in yet another embodiment, the VTP may contain a third comonomer, thus, the C4 through C14 content (units derived from C4 to C14 α-olefins or dienes) is from 5 to 30 wt % in those embodiments, while the C2 content is from 5 to 50 wt % and the C3 content is from 20 to 90 wt %.

In any embodiment, greater than 70, or 80, or 90, or 94, or 96% of the VTP comprises terminal vinyl groups; or within the range of from 50, or 60 wt % to 70, or 80, or 90, or 95, or 98 or 99%. As described above, the vinyl/vinylidene-terminated polyolefins preferably have a number average molecular weight (Mn) value of at least 1000, or 5000, or 20,000 g/mole, or within the range of from 200, or 400, or 500, or 1,000, or 10,000, or 20,000 g/mole to 20,000, or 30,000, or 40,000, or 50,000, or 65,000, or 100,000 g/mole. The vinyl/vinylidene-terminated polyolefins preferably have a weight-average molecular weight (Mw) value of at least 500, or 800, or 1000, or 5000, or 20,000 g/mole, or within the range of from 500, or 800, or 1000, or 2000, g/mole to 6,000, or 10,000, or 12,000, or 20,000, or 30,000, or 40,000 or 50,000, or 100,000, or 200,000, or 300,000 g/mole. Preferably, the VTP useful herein is amorphous polypropylene, and desirably has a glass transition temperature (Tg) of less than 10 or 5 or 0° C., more preferably less than −10° C.; or within the range of from 0, or −5, or −10° C. to −30, or −40, or −50° C. or as described herein.

The VTPs are preferably linear, meaning that there is no polymeric or oligomeric branching from the polymer backbone, or described quantitatively, having a branching index "g" (or g'(vis avg)) of at least 0.90 or 0.96 or 0.97 or 0.98, wherein the "branching index" is well known in the art and measurable by published means, and the value of such branching index referred to herein is within 10 or 20% of the value as measured by any common method of measuring the branching index for polyolefins as is known in the art such as in US 2013/0090433.

A particularly preferred VTP is one wherein the vinyl terminated polyolefin is a compound or mixture of compounds represented by the formula (11):

(11)

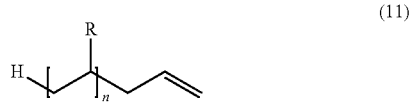

wherein each "R" is selected from hydrogen and C1 to C4 or C10 alkyls, preferably hydrogen or methyl, or a mixture thereof; and n is an integer from 20, or 50 to 100, or 200, or 500, or 800, or 1000, or 1500, or 2000. It is these VTPs that are reacted, under suitable conditions, with a functionalizing agent to form the functionalized polyolefins which can react with the functionalized silanes described herein to form silane functionalized polyolefins.

The various descriptive elements and numerical ranges disclosed herein for the inventive silane functionalized polyolefin, graft polyolefin, polyolefin nanocomposite, and methods of forming such can be combined with other descriptive elements and numerical ranges to describe the invention(s); further, for a given element, any upper numerical limit can be combined with any lower numerical limit described herein, including the examples. The features of the inventions are demonstrated in the following non-limiting examples.

EXAMPLES

Synthesis of Vinyl Terminated Isotactic Polypropylene (iPP) and Vinyl Terminated Polyethylene (PE).

Vinyl terminated isotactic polypropylene and vinyl terminated polyethylene were synthesized using organometallic coordinated polymerization as described in the previous patent applications. Most specifically, vinyl terminated iPP was prepared in according to procedures outlined in U.S. Pat. No. 6,117,962 and vinyl terminated PE was synthesized following the processes discussed in US 2014-0039140 A1.

Functionalization of Vinyl Terminated iPP with Alkoxysilane.

Under nitrogen protection, 20 g vinyl terminated-iPP (VT-iPP, Mn 18,000 g/mole) was fully dissolved in 200 mL xylenes at 90° C. in a 500 mL 3-neck round-bottom flask (RBF) equipped with a condenser. After the polymer was fully dissolved, 2 g meta-chloroperoxybenzoic acid (m-CPBA) was added into the reaction mixture. The reaction was allowed to proceed at 90° C. After 4 hours, another 2 g m-CPBA was added into the reaction mixture and the reaction was continuously run overnight. The next day, when the reaction mixture was still warm, it was precipitated to 2 L methanol to recover the polymer product. The polymer product was filtered, washed with fresh methanol several times and dried in 60° C. vacuum oven until constant weight. The polymer product (iPP-epoxide) was characterized by proton nuclear magnetic resonance ($^1$H NMR) and compared to the starting material. Nuclear magnetic resonance (NMR) spectra were acquired using a Bruker 500 MHz spectrometer referenced to a residual solvent peak. The samples were dissolved in 1,1,2,2-tetrachloroethane-d$_2$ (TCE-d$_2$) and spectra taken, the results of which are in FIG. 1. To illustrate, the general scheme of the reaction is as follows:

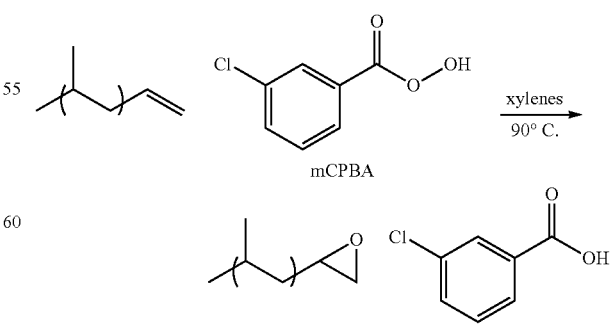

Figure 2:
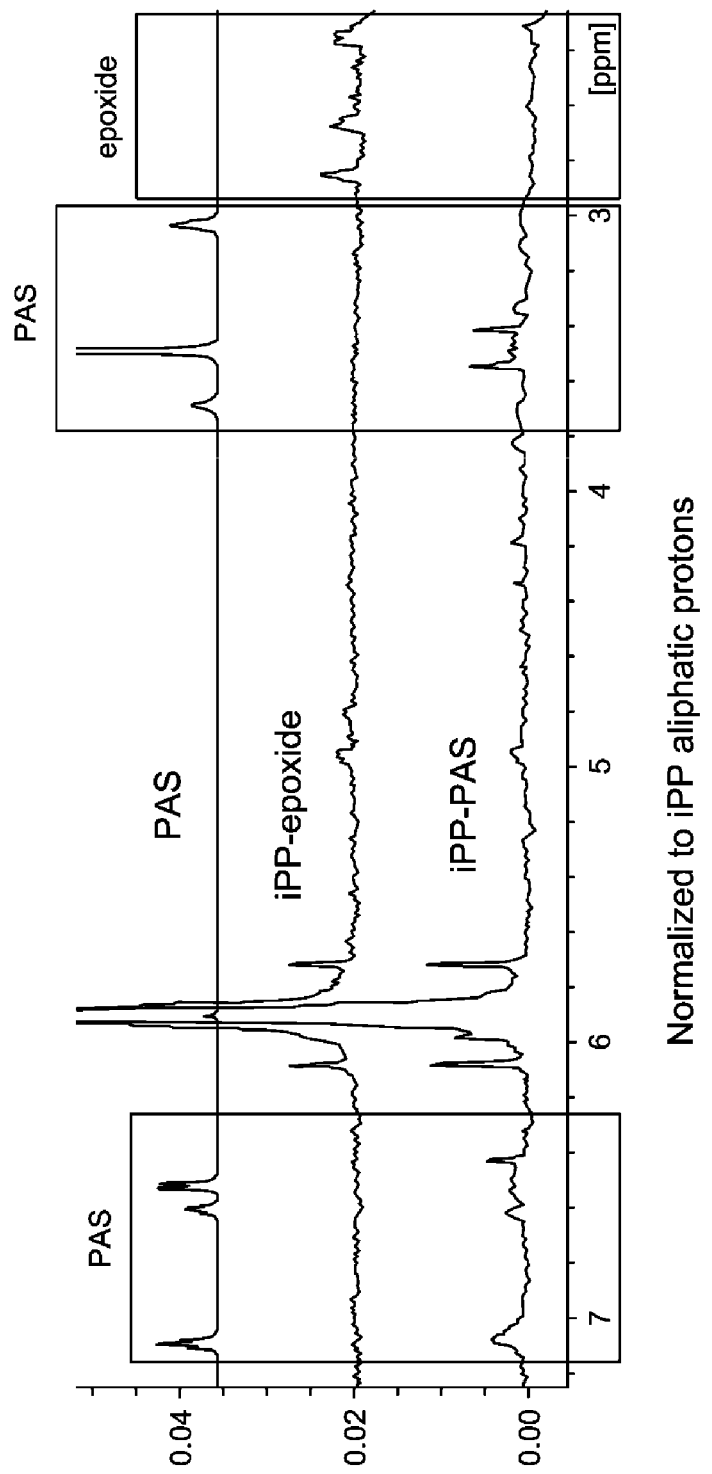
FIG. 2 is an offset overlay of $^1$H NMR (500 MHz) (same x-axis) spectra of N-Phenylaminopropyltrimethoxysilane (PAS), the functionalized iPP, and the PAS-iPP, evidencing the progression of the functionalization reactions.

Under nitrogen protection, 8 g iPP-epoxide was fully dissolved in 120 mL anhydrous toluene in a 250 mL 3-neck RBF equipped with a condenser at 90° C. After complete dissolution, 0.6 g N-Phenylaminopropyltrimethoxysilane (PAS, propylene linker) was added into the reaction mixture followed by 0.3 g magnesium bromide ethyl etherate. The heating temperature was increased to 120° C. and the reaction was allowed to proceed at refluxing overnight. The next day when the reaction mixture was still warm, it was precipitated to 1 L isopropanol. The polymer product was filtered, washed with fresh isopropanol several times and dried in 60° C. vacuum oven until constant weight. The polymer product (iPP-PAS) was characterized by $^1$H NMR and compared to the starting material, shown in FIG. 2. To illustrate, the general scheme of the reaction is as follows:

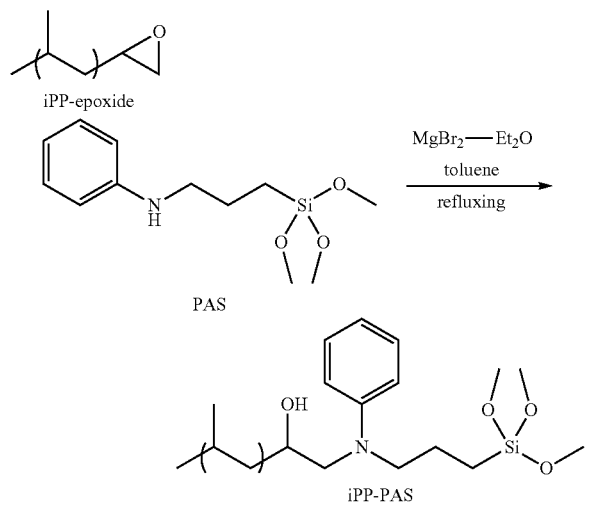

Functionalization of Vinyl Terminated PE with Alkoxysilane.

PE-epoxide and PE-PAS were synthesized and characterized the same way described above.

Grafting Silane Functionalized iPP onto Colloidal Silica.

Under nitrogen protection, 6 g iPP-silane was fully dissolved in 100 mL anhydrous toluene in a 250 mL 3-neck RBF equipped with a condenser at refluxing temperature. After complete dissolution, 2 mL Ludox™ (34 wt % colloidal silica aqueous solution) was added into the reaction mixture. The reaction was allowed to proceed at refluxing temperature overnight. The next day while the reaction mixture was still warm, it was precipitated to 1 L methanol. The product was filtered, washed with fresh methanol several times, and dried in a vacuum oven at 60° C. until constant weight.

Grafting silane functionalized PE and iPP onto colloidal silica. Under nitrogen protection, 6 g iPP-silane and 6 g PE-silane were fully dissolved in 250 mL anhydrous toluene in a 500 mL 3-neck RBF equipped with a condenser at refluxing temperature. After complete dissolution, 5 mL Ludox was slowly added into the reaction mixture dropwise. The reaction was allowed to proceed at refluxing temperature overnight. The next day while the reaction mixture was still warm, it was precipitated to 1 L methanol. The product was filtered, washed with fresh methanol several times, and dried in a vacuum oven at 60° C. until constant weight.

Dispersing grafted silica in an EP copolymer. Isotactic-PP-g-silica-g-PE thus made with PAS silane (phenylaminopropyltrimethoxylsilane) and with 4-aminobutyltriethoxysiliane (butylene linker) were dispersed in Vistamaxx™ Performance Polymer 6100 (VM 6100, ExxonMobil Chemical, propylene ethylene copolymer with 16 wt % ethylene) at 15 wt %. Then, 6 g VM6100 was fully dissolved in 100 mL anhydrous toluene in a 250 mL 3-neck RBF equipped with a condenser at refluxing temperature. After complete dissolution, 0.9 g of iPP-g-silica-g-PE was added into the solution. The solution mixing was allowed to proceed at refluxing temperature for 1 hour. Afterward, it was precipitated to 1 L methanol. The product was filtered, washed with fresh methanol several times, and dried in a vacuum oven at 60° C. until constant weight. The subsequent blends of iPP-g-silica-g-PE in VM6100 were then cryo-faced using a Leica™ cryomicrotome for dispersion evaluations by bimodal AFM (Cypher AFM, Asylum Research).

Figure 3:
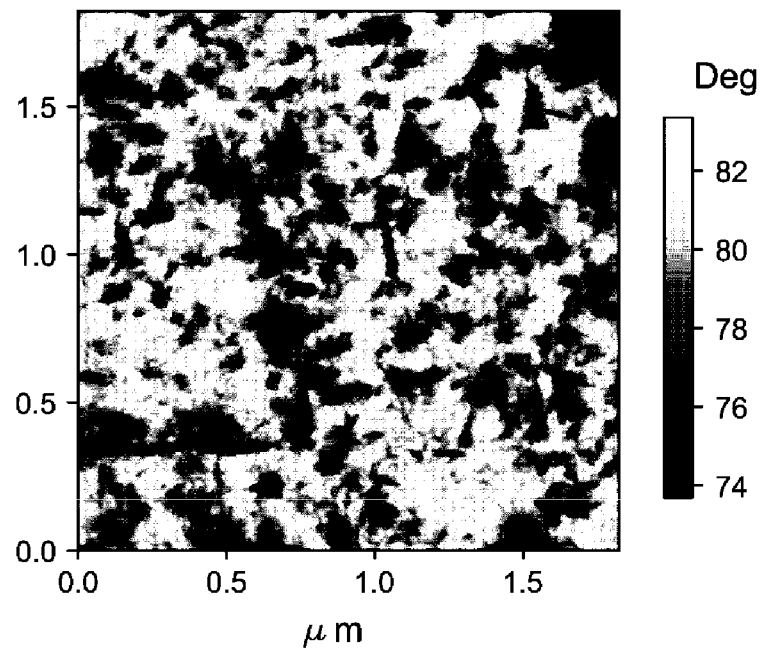
FIG. 3 is a bimodal AFM cryomicrotome of a 15 wt % dispersion of iPP-g-silica-g-PE with PAS (propylene linker) silane in Vistamaxx™ 6100 Performance Polymer (VM6100).
Figure 4:
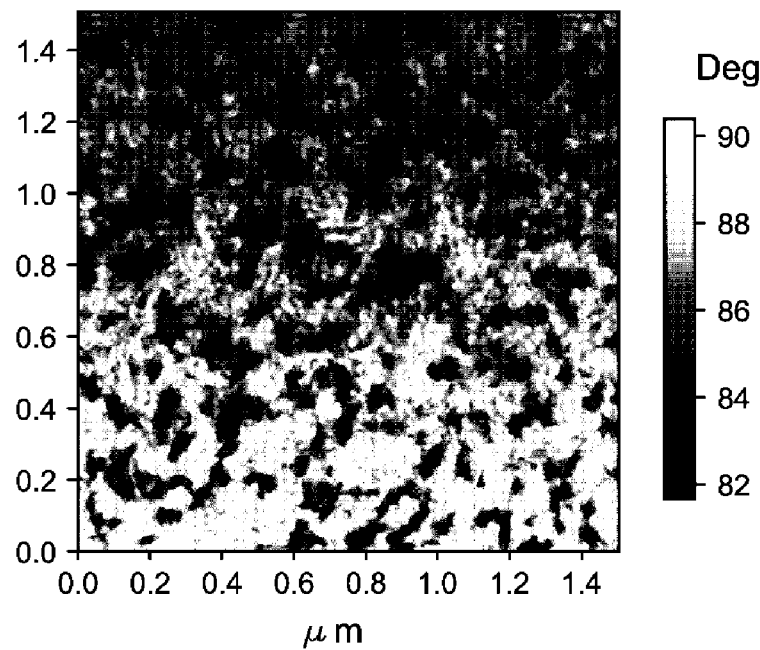
FIG. 4 is a bimodal AFM cryomicrotome of a 15 wt % dispersion of iPP-g-silica-g-PE with PAS (butylene linker) in VM6100.

As shown in FIGS. 3 and 4, both iPP-g-silica-g-PE with different silane functionalities can be finely dispersed in VM 6100 with the smaller cluster size and better dispersion demonstrated for iPP-g-silica-g-PE with 4-aminobutyltriethoxysiliane. Black particles, clusters and aggregates are silica. The purple and orange halos surrounding the particle clusters are the grafted crystalline polyolefins. Purple and orange PP and PE lamellae can be seen emanated out from the particle surfaces. Some isolated lamellae can be seen and they may be assigned as the ungrafted PE and PP. The yellow background is the amorphous VM 6100 copolymer. Silica particles without grafting cannot be dispersed in VM 6100. Since VM6100 is a copolymer of ethylene and propylene with majority propylene, the fillers with bi-composition polyolefin grafting (PE and iPP) are better suited. Uniquely, this iPP-g-silica-g-PE bi-composition grafted fillers can be used are reinforcing fillers in PE, PP and copolymers of ethylene and propylene.

Mechanical properties of polyolefin nanocomposites. Isotactic PP-g-silica-g-PE using 4-aminobutyltriethoxysiliane was dispersed in PP3155 (isotactic PP, ExxonMobil Chemical, 35 MFR) at 15 wt %, in Exceed™ 1018 (LLDPE, ExxonMobil Chemical. 0.918 g/cm$^3$, 1.0 g/10 min (ASTM 1238, 190° C./2.16 kg)) at 15 wt %, and in VM6100 at 15 wt % by solution mixing. The final silica loading is 7 wt % for all. Afterward, the blends were compression tensile specimens of 4-mm width, 2-mm thickness, and 50-mm length for mechanical testing. Flexural moduli were measured at 1 mm/min test speed. The modulus data are summarized in Table 1. Due to presence of bubbles after compression molding, iPP-g-silica-g-PE filled PP 3155 and Exceed 1018 cannot be tested. Only iPP-g-silica-g-PE filled VM6100 contained no bubbles after compression molding. In Table 1, 15 wt % of iPP-g-silica-g-PE was added, which corresponds to 7 wt % of silica.

TABLE 1

Flexural moduli of polyolefins.

| Materials | Modulus (MPa) |
| --- | --- |
| Exceed 1018 | 290 |
| Exceed 1018 with 15 wt % iPP-g-silica-g-PE | nm |
| PP 3155 | 1,630 |
| PP3155 with 15 wt % iPP-g-silica-g-PE | nm |
| VM6100 | 2.7 |
| VM6100 with 15 wt % iPP-g-silica-g-PE | 4.5 |

*nm: not measured

Now, having described the various features of the silane functionalized polyolefins, graft polyolefins, and nanocomposites therefrom, described here in numbered paragraphs is:

P1. A silane functionalized polyolefin comprising compounds having the following structure:

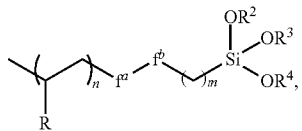

wherein $R^2$, $R^3$, and $R^4$ are independently selected from hydrogen, C1 to C10 linear alkyls, C6 to C14 aryls, C7 to C20 alkylaryls, and substituted versions thereof;
R is selected from hydrogen or C1 to C10 alkyls;
n has a value within the range from 20 to 2000;
m has a value within the range from 1 to 10 or 20; and
$f^a$ and $f^b$ are residual functional moieties selected from carbon, oxygen, nitrogen, sulfur, phosphorous, silicon, and boron, where any remaining valences are bound to a group selected from hydrogen, C1 to C10 linear alkyls, C6 to C14 aryls, C7 to C20 alkylaryls, and substituted versions thereof.

P2. The silane functionalized polyolefin of numbered paragraph 1, having the following structure:

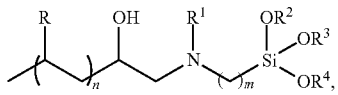

wherein $R^1$, $R^2$, $R^3$, and $R^4$ are independently selected from hydrogen, C1 to C10 linear alkyls, C6 to C14 aryls, C7 to C20 alkylaryls and arylalkyls, and substituted versions thereof;
R is selected from hydrogen or C1 to C10 alkyls;
n has a value within the range from 20 to 2000; and
m has a value within the range from 1 to 10 or 20.

P3. The silane functionalized polyolefin of numbered paragraphs 1 or 2, wherein $R^2$, $R^3$, and $R^4$ are independently selected from hydrogen, and C1 to C10 linear alkyls.

P4. The silane functionalized polyolefin of any one of the previous numbered paragraphs, comprising a polyolefin portion and the silane functional portion, wherein the polyolefin portion is a polypropylene, polyethylene, or ethylene propylene copolymer.

P5. A graft polyolefin comprising (or consisting essentially of) the silane functionalized polyolefin of any one of the previous numbered paragraphs and at least one surface hydroxyl-containing inorganic or carbon filler.

P6. The graft polyolefin of numbered paragraph 5, wherein the fillers are selected from solid materials having surface hydroxyl groups.

P7. The graft polyolefin of numbered paragraph 5, wherein the filler is selected from silicates, aluminates, borates, such as silica, quartz, glass, alumina, alumino-silicates, silicon, copper, copper oxide, tin, tin oxide, talc, iron oxide, chromium oxide, steel, iron, nickel, zinc, lead, and calcium carbonate.

P8. The graft polyolefin of numbered paragraph 5, where the filler has an average particle size of less than 0.1 µm in one dimension.

P9. A polyolefin nanocomposite comprising the graft polyolefin of numbered paragraph 5 and at least one polyolefin selected from polypropylene, polyethylene, and ethylene-propylene copolymers.

P10. A fabric or film comprising the polyolefin nanocomposite of numbered paragraph 9.

P11. A method of forming a silane functionalized polyolefin of any one of the previous numbered paragraphs comprising combining the following components:
a functionalized polyolefin having the following structure:

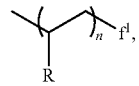

wherein n has a value within the range from 20 to 2000;
R is selected from hydrogen or C1 to C10 alkyls; and
$f^1$ is functional moiety capable of forming a covalent bond through a chemical reaction with a complementary functional moiety, $f^2$; and
a functionalized silane having the following structure:

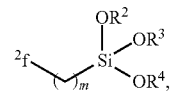

wherein m has a value within the range from 1 to 10 or 20;
$R^2$, $R^3$, and $R^4$ are independently selected from hydrogen, C1 to C10 linear alkyls, C6 to C14 aryls, C7 to C20 alkylaryls, and substituted versions thereof; and
$f^2$ is a functional moiety capable of forming a covalent bond through a chemical reaction with a complementary functional moiety, $f^1$.

P12. The method of numbered paragraph 11, wherein the functionalized silane has the following structure:

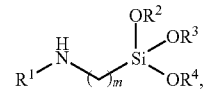

wherein m has a value within the range from 1 to 10 or 20; and
$R^1$, $R^2$, $R^3$, and $R^4$ are independently selected from hydrogen, C1 to C10 linear alkyls, C6 to C14 aryls, C7 to C20 alkylaryls and arylalkyls, and substituted versions thereof.

P13. The method of numbered paragraph 11, wherein the functionalized polyolefin has the following structure:

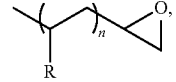

wherein n has a value within the range from 20 to 2000, and R is selected from hydrogen or C1 to C10 alkyls.

The phase "consisting essentially of" means that no other additives are present in the composition being referred to other than those named, or, if present, are present to a level no greater than 0.5, or 1.0, or 2.0, or 4.0 wt % by weight of the composition.

Also disclosed is the use of a silane functionalized polyolefin as described above in a graft polyolefin and/or polyolefin nanocomposite, and further, its use in an article such as a film or fiber.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A method of forming a silane functionalized polyolefin comprising combining the following components:

a functionalized polyolefin having the following structure:

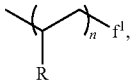

wherein n has a value within the range from 20 to 2000; R is selected from hydrogen or C1 to C10 alkyls; and $f^1$ is functional moiety capable of forming a covalent bond through a chemical reaction with a complementary functional moiety, $f^2$; and a functionalized silane having the following structure:

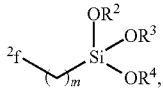

wherein m has a value within the range from 1 to 20;

$R^2$, $R^3$, and $R^4$ are independently selected from hydrogen, C1 to C10 linear alkyls, C6 to C14 aryls, C7 to C20 alkylaryls, and substituted versions thereof; and $f^2$ is a functional moiety capable of forming a covalent bond through a chemical reaction with a complementary functional moiety, $f^1$.

2. The method of claim 1, wherein the functionalized silane has the following structure:

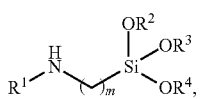

wherein m has a value within the range from 1 to 20; and $R^1$, $R^2$, $R^3$, and $R^4$ are independently selected from hydrogen, C1 to C10 linear alkyls, C6 to C14 aryls, C7 to C20 alkylaryls, and substituted versions thereof.

3. The method of claim 1, wherein the functionalized polyolefin has the following structure:

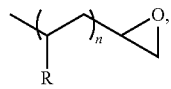

wherein n has a value within the range from 20 to 2000, and R is selected from hydrogen or C1 to C10 alkyls.

4. The method of claim 1, wherein $R^2$, $R^3$, and $R^4$ are independently selected from hydrogen, and C1 to C10 linear alkyls.

5. The method of claim 1, wherein the functionalized polyolefin is a functionalized polypropylene, a functionalized polyethylene, or a functionalized ethylene-propylene copolymer.

6. The method of claim 1, wherein the functionalized polyolefin is obtained by combining a vinyl/vinylidene-terminated polyolefin with a functionalizing agent.

7. The method of claim 6, wherein the functionalizing agent is selected from haloperoxybenzoic acids and haloperoxy C1 to C10 alkyl acids, maleic anhydrides, and benzyl halides.

8. The method of claim 1, further comprising combining the silane functionalized polyolefin with a surface hydroxyl-containing inorganic or carbon filler to form a graft polyolefin.

9. The method of claim 8, wherein the filler is selected from solid materials having surface hydroxyl groups.

10. The method of claim 8, wherein the filler is selected from the group consisting of silicates, aluminates, borates, silica, quartz, glass, alumina, alumino-silicates, silicon, copper, copper oxide, tin, tin oxide, talc, iron oxide, chromium oxide, steel, iron, nickel, zinc, lead, and calcium carbonate, and mixtures thereof.

11. The method of claim 8, where the filler has an average particle size of less than 0.1 µm in one dimension.

12. The method of claim 8, further comprising combining the graft polyolefin with at least one polyolefin selected from polypropylene, polyethylene, and ethylene-propylene copolymer to form a polyolefin nanocomposite.

* * * * *